United States Patent
Li et al.

(10) Patent No.: US 7,792,116 B2
(45) Date of Patent: Sep. 7, 2010

(54) METHOD AND DEVICE FOR INTERWORKING BETWEEN INTERNET PROTOCOL NETWORKS

(75) Inventors: Hui Li, Guangdong (CN); Yajuan Wu, Guangdong (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 242 days.

(21) Appl. No.: 11/703,709

(22) Filed: Feb. 8, 2007

(65) Prior Publication Data

US 2007/0195755 A1 Aug. 23, 2007

Related U.S. Application Data

(63) Continuation of application No. PCT/CN2005/001640, filed on Oct. 8, 2005.

(30) Foreign Application Priority Data

Oct. 5, 2004 (CN) .................. 2004 1 0079321

(51) Int. Cl.
    H04L 12/56 (2006.01)
    H04J 3/16 (2006.01)
(52) U.S. Cl. ...................... 370/392; 370/466
(58) Field of Classification Search ........... None
    See application file for complete search history.

(56) References Cited

U.S. PATENT DOCUMENTS

| | | | |
|---|---|---|---|
| 6,580,717 B1 | 6/2003 | Higuchi et al. | |
| 2002/0093960 A1* | 7/2002 | Tsuchiya et al. | 370/390 |
| 2003/0149790 A1* | 8/2003 | Hwang | 709/245 |
| 2003/0193965 A1* | 10/2003 | Higuchi et al. | 370/466 |
| 2003/0225912 A1* | 12/2003 | Takeda et al. | 709/246 |
| 2004/0001509 A1* | 1/2004 | Zhang et al. | 370/466 |
| 2004/0146042 A1* | 7/2004 | Ideshita et al. | 370/349 |

(Continued)

FOREIGN PATENT DOCUMENTS

| CN | 1496070 | 5/2004 |
|---|---|---|
| CN | 1518301 | 8/2004 |

OTHER PUBLICATIONS

3GPP TR 23.981 v6.1.0 (Sep. 2004) Technical Report, 3rd Generation Partnership Project, Global System for Mobile Communications.

(Continued)

*Primary Examiner*—Ricky Ngo
*Assistant Examiner*—Clemence Han
(74) *Attorney, Agent, or Firm*—Slater & Matsil, L.L.P.

(57) ABSTRACT

Embodiments of the present invention provide a method and device for interworking between Internet Protocol (IP) networks of. The method includes: judging whether the home network of a called UE supports the IP version of a calling UE, and forwarding a message sent from the calling UE to a home calling state control device of the called UE if yes, otherwise, performing an IP version transformation of the message and sending the message to the home calling state control device of the called UE; judging whether the called UE supports the IP version of the message, forwarding the message to the called UE if yes, otherwise, performing an IP version transformation of the message and sending the message to the called UE. The method and device can reduce unnecessary transformation between different IP versions and improve the interworking between IP networks when the IP Multimedia Subsystem (IMS) is employed.

18 Claims, 3 Drawing Sheets

U.S. PATENT DOCUMENTS

2005/0066038 A1* 3/2005 Sakamoto et al. .......... 709/227
2006/0227780 A1* 10/2006 Inouchi et al. ............. 370/389
2007/0081530 A1* 4/2007 Nomura et al. ............. 370/389

OTHER PUBLICATIONS

English Translation of the Written Opinion of the International Searching Authority, International application No. PCT/CN2005/001640, Date of mailing Jan. 5, 2006, 3 pages.

Chinese Office Action, Application No. 200410079321.1, dated Sep. 7, 2007, 6 pages.

Extended European Search Report, Application No./Patent No. 05795754.0—1244 PCT/CN2005001640, dated Oct. 12, 2007, 6 pages.

European Office Action, Application No. 05 795 754.0—1244, dated Oct. 8, 2008, 5 pages.

* cited by examiner

METHOD AND DEVICE FOR INTERWORKING BETWEEN INTERNET PROTOCOL NETWORKS

CROSS-REFERENCE TO RELATED APPLICATIONS

This is a continuation of International Application No. PCT/CN2005/001640, filed on Oct. 8, 2005, now published as WO 2006/037267, published date Apr. 13, 2006, which designated the United States; which claims priority of Chinese Patent Application No. 200410079321.1, filed Oct. 5, 2004, the disclosure of each application is hereby incorporated by reference in their entirety.

FIELD OF THE TECHNOLOGY

The present invention relates to network interworking technologies, and particularly, to interworking between Internet Protocol (IP) networks related to the IP Multimedia Core Network subsystem.

BACKGROUND OF THE INVENTION

The mobile communication system can meet the demands of people for communicating anywhere and any time and has been developed very quickly since its coming into existence. Along with the proposal and further development of the Third Generation (3G) mobile communication technologies, the bandwidth of the mobile network has been greatly increased, the mobile communication will no longer be limited to the traditional voice communication, and multimedia services combining various multimedia, such as audio, video, picture and text, will be developed gradually. The combination of mobile communication and data services, such as a presence service, a short message service, a web browsing service, a positioning information service, a push service, and a file sharing service, can provide a user with more services, including the message services, such as immediate messaging, chat room, and multimedia short message, video services, such as entertainment, multimedia information, and daily communication, e-business services, such as catalogue, search engine, shopping cart, order management and payment, game services such as single player game and group game, location services such as person searching, guiding and warning, and personal assistant services, such as address book, schedule, bookmark management, file storing, event reminder and e-mail, so as to meet various user demands more properly.

Considering that the IP network has seen increasingly wide application, standardization organizations, such as the $3^{rd}$ Generation Partnership Project (3GPP) and the $3^{rd}$ Generation Partnership Project 2 (3GPP2), have constituted a standard for developing the mobile network to a whole packet and whole IP network and also have proposed a multimedia subsystem architecture based on the IP for the purpose that uniform standard open architecture is to be used in the mobile network to implement various multimedia applications to provide more choices and more experiences for a user.

An IP multimedia subsystem (IMS) domain which is overlaid on a packet domain network has been introduced at the stage of Release 5 (R5) by the 3GPP. The IMS includes function entities, such as a Call Session Control Function (CSCF), a Media Gateway Control Function (MGCF), a Multimedia Resource Function (MRF) and a Home Subscriber Server (HSS). The CSCF can be further categorized into three logical entities, Serving CSCF (S-CSCF), Proxy CSCF (P-CSCF) and Interrogating CSCF (I-CSCF), according to different functions implemented by a CSCF; the S-CSCF is a service switching center of the IMS, which is used for executing session control, keeping session state, managing user information and generating charging information etc.; the P-CSCF is an access point where a user terminal accesses the IMS, used for registering a user, controlling Quality of Service (QoS) and managing security etc.; the I-CSCF is used for searching a route, such as the interworking in an IMS domain and the interworking between IMS domains, managing the allocation of an S-CSCF, hiding the topology architecture and configuration of a network from an external network and other IMS domains, and generating charging information etc. The MGCF implements gateway control to achieve the interworking between an IMS network and other networks. The MRF provides media resources, such as receiving and playing a voice, encoding and decoding information transmitted between user terminals, and multimedia conference bridge. The HSS is a user database storing the subscription data and the configuration information of users in an IMS network.

Because the architecture of the IMS network has been implemented as independent of the bottom-layer bearer network, the IMS network defined by the 3GPP can also be applied to other packet networks besides the packet domain network defined by the 3GPP, such as a packet network defined by the 3GPP2, a Wireless Local Area Network (WLAN) and a Next Generation Network (NGN), which makes the type of a user terminal and the type of an access network independent of the network. The use of the IMS network is not limited to a network or an application related to the 3GPP, that is, services and applications of other types of access networks and bearer networks can also be implemented by using the IMS architecture.

The Session Initiation Protocol (SIP), which is an IP telephone signalling protocol proposed by the Internet Engineering Task Force (IETF), is used as the signalling control protocol for an IP multimedia session. As implicated in its name, the SIP, which is used for initiating a session, can control the establishment and termination of a multimedia session in which multiple participants take part, regulate and revise dynamically the attribute of the session, such as the demand for session bandwidth, the types of multimedia (such as a voice, a video and a text) to be transmitted, the encoding and decoding format of the multimedia, and the support for multicast and unicast.

The 3GPP, when constituting criterions related to the IMS, specifies expressly that a user terminal must support the communication using the Internet protocol version 6 (IPv6) addresses when an IP multimedia service is implemented in view of the problems in the Internet Protocol version 4 (IPv4), such as the address space being about to be exhausted, the explosion of the route table, and the fact that a large number of IP addresses are needed in the wide application of the IMS and higher requirements have been set for network security, network quality and network mobility in the NGN implementing the amalgamation of multiple media. Regarding function entities in a mobile network, all the function entities in the IMS, which include User Equipment (UE), CSCF, MGCF, MRF and Application Server (AS), must support the IPv6. Because a GPRS Gateway Support Node (GGSN) has an interface with the IMS, the GGSN must support the IPv6, and the GGSN must also support the Dynamic Host Configuration Protocol (DHCP) of the IPv6 to support dynamic address resolution.

Along with changes of the market and development of the technologies, however, the large-scale commercial use of the IPv6 has not attained the speed expected initially and lacks the supports of all the IPv6 based products, so that IPv6 based IMS applications has been postponed. To provide more abundant multimedia services for a 3G user and promote the commercial use of the Wideband Code Division Multiple Access (WCDMA) IMS as soon as possible to attract more users and promote the development of the 3G network. Mobile operators have suggested to the 3GPP that the IPv4 should be supported in implementing the IMS to meet the demand of the early commercial use. At the same time, the Multimedia Domain (MMD), defined by the standardization organization 3GPP2 of Code Division Multiple Access 2000 (CDMA2000) which is another mainstream of 3G, can be implemented based on the IPv4 or the IPv6, and there have been respectable SIP terminals in commercial use which is based on the IPv4. This will result in a problem in the interworking between the IMS of the 3GPP based on the IPv6 and the external network based on the IPv4. Therefore, the 3GPP decides to add a function for supporting the IPv4 to an early IMS product, which enables the IMS to support the IPv6 and/or the IPv4 at the same time. Thus, the 3GPP needs to study how to introduce the IPv4 based IMS, and how to address such issues as the interworking and roaming between the IPv4 based IMS and IPv6 based IMS, and the interworking between IMS and IPv4 SIP applications.

Various possible interworking problems have already been analyzed in the 3GPP technical report (TR) 23.981, including: the IP version supported by a UE, the IP version supported by an IMS network, the IP version supported by a GPRS network, the roaming situation, an end-to-end interworking scenario, IP version interworking involving a service. A Network Address Translation and Protocol Translation (NAT-PT) function and an Application Layer Gateway (ALG) function are employed where the IP version interworking is needed. The NAT-PT function is used for transforming a network address and a protocol, and the ALG function is used for transforming a related address in the application layer.

Because the time delay of a session is increased once the NAT-PT function and the ALG function are used, the QoS is decreased. This makes clear that the less times an IP address is transformed, the less influence is laid on the QoS of the session, and the loads on the devices implementing the NAT-PT function and ALG function as well as the number of network bottlenecks will be reduced. Therefore, when to introduce the NAT-PT function and ALG function needs to be considered in the implementation of the interworking between the IPv4 and the IPv6 so as to minimize the transforming times in the end-to-end interworking procedure.

The existing solution to the interworking between the IPv4 and the IPv6 in the IMS was proposed by the 3GPP. In the existing technical solution, a UE may support only an IPv4 stack, or only an IPv6 stack, or an IPv4 and IPv6 dual stack; likewise, other function entities involving a session building process, such as a peer UE, an AS, a CSCF, a GGSN, can support only an IPv4 stack, or only an IPv6 stack, or an IPv4 and IPv6 dual stack.

Considering that the development tendency of the IMS network is to use IPv6 addresses only, and because existing IPv4 addresses are in short supply, many operators use IP addresses of a private network, which results in that an IPv4 address must be transformed into an IP address of a public network when an interworking with other IP domain networks is performed. Therefore, in the existing technical solution, it is suggested to make the most of an IPv6 address, which can reduce the cases of using the functions of the ALG and the NAT-PT, thereby improving the QoS of the session.

In the version interworking involving a service, the solution to implement an immediate messaging service between a UE supporting the IPv4 and a UE supporting the IPv6, which is suggested by the 3GPP, is shown in FIG. 1. In FIG. 1, UE A supports the IPv4, and because no media component negotiation is involved, UE A directly uses SIP signalling to carry the related information when sending an immediate message to UE B; UE B supports the IPv6, and the home network of UE B is different from that of UE A. At the initiating side, the home S-CSCF of UE A supports the IPv4 and IPv6 dual stack, which directly transforms an SIP message transmitted by using the IPv4 into an SIP message transmitted by using the IPv6, then continues to send the message to the receiver, UE B.

In the case that a UE in an IMS network initiates a session, the procedure of an existing solution to interworking is shown in FIG. 2. In FIG. 2, the IMS-ALG means an ALG function in the IMS network, the TrGW is an NAT-PT function in the IMS network. As illustrated in FIG. 2, the session initiator UE A supports the IPv6 and the home S-CSCF of UE A supports the IPv4 and IPv6 dual stack. If the home S-CSCF of UE A determines, by a mechanism such as the Domain Name System (DNS) query, that the receiver cannot communicate by the IPv6, the S-CSCF replaces information involving the IPv6 version in the SIP message through the interaction with the IMS-ALG and TrGW, then continues the session negotiation with UE B using the IPv4 to set up a media transmission path.

As can be seen from the above, in the existing solution to the interworking between different IP versions, the IP versions supported by the UE of both communication sides, that is, the IPv4 used by the initiator and the IPv6 used by the receiver, or the IPv6 used by the initiator and the IPv4 used by the receiver, are determined first, then according to this precondition, a mapping of information related to IP versions is performed where the ALG/NAT-PT function can be used as early as possible, that is, the home S-CSCF of the initiator UE supporting a dual stack. Those skilled in the art can understand that the IPv6 is used preferentially in the existing technical solution, that is, transformation from the IPv4 to the IPv6 will be performed once the next function entity can support the IPv6.

In the existing technical solution, conditions of the interworking between different IP versions in the IMS are not considered comprehensively. Furthermore, an unnecessary version transformation is likely to be implemented in the interworking between different IP versions, which increases the loads on ALG/NAT-PT devices and thereby affects the QoS of a session. There are two main reasons for this situation. First, it is considered in the existing technical solution that the initiator uses the IPv4 and the receiver uses the IPv6, or the initiator uses the IPv6 and the receiver uses the IPv4, while this is not the case in practical situations. An early IMS in commercial use may support only the IPv4 because of limitations of services and bad usability of IPv6 based devices, while an IMS network which is implemented later on may support the IPv4 and IPv6 dual stack so as to have forward compatibility and backward compatibility, and an IMS network which is implemented when the technologies are more steady and the market is more mature may support only IPv6. Therefore, all the three types of IMS network must be considered when implementing the version interworking, and especially in the early phase of using the IMS network, the interworking with a great deal of the existing IPv4 networks and services also needs to be considered. Otherwise, there may be a great deal of transformation between IP versions which can be avoided essentially. For example, in the case that the home network of a calling UE supports only IPv4, the home network of the called UE supports the IPv4 and IPv6 dual stack, and both the calling UE and the called UE use an IPv4 address, the home network of the calling UE must not perform the transformation from the IPv4 address to the IPv6 address. However, the transformation has to be performed in the existing technical solution.

Second, in practice, the home S-CSCF of a calling UE cannot acquire in advance the type of the IP address which is used by the called UE and can only learn the type of the address of the IP domain where the home network of the called UE is located. In the case that the called UE roams to another network and the IP address of the called UE is assigned by the roaming network, only the home S-CSCF of the called UE knows the IP version which is used by the called UE. According to the processing procedure in the prior art, after a mapping of information related to IP versions is performed where the ALG/NAT-PT can be used as early as possible, a new ALG/NAT-PT transformation may still be needed when a message reaches the home network of the called UE. For example, in the case that the home network of the calling UE supports only IPv4, the home network of the called UE supports the IPv4 and IPv6 dual stack, and both the calling UE and the called UE use an IPv4 address, such transformations are not needed and can be avoided.

SUMMARY OF THE INVENTION

Embodiments of the present invention provide a, method and device for interworking between networks of different Internet Protocol (IP) versions.

A method for interworking between Internet Protocol (IP) networks includes:

judging, by a home calling state control device of a calling UE, whether the home network of a called UE supports the IP version of the calling UE, and forwarding a message sent from the calling UE to a home calling state control device of the called UE if yes, otherwise, performing an IP version transformation of the message and sending the message to the home calling state control device of the called UE.

The method further includes:

judging, by the home calling state control device of the called UE, whether the called UE supports the IP version of the message upon receiving the message, forwarding the message to the called UE if yes, otherwise, performing an IP version transformation of the message and sending the message to the called UE.

The process of performing an IP version transformation of the message includes:

judging, by the home calling state control device of the calling UE, whether the message contains a media description;

performing the IP version transformation of the message using a device of the application layer gateway and a device of network address translation and protocol translation if the message contains the media description;

performing the IP version transformation of the message directly if the message does not contain the media description.

The process of performing an IP version transformation of the message includes:

judging, by the home calling state control device of the called UE, whether the message contains a media description;

performing the IP version transformation of the message using a device of the application layer gateway and a device of network address translation and protocol translation if the message contains a media description;

performing the IP version transformation of the message directly if the message does not contain a media description.

A calling state control device includes:

a first unit, configured to judge whether the home network of a called UE supports the Internet Protocol (IP) version of a calling UE upon receiving a message sent from the calling UE;

a second unit, configured to forward the message to the home calling state control device of the called UE if the home network of a called UE supports the IP version of the calling UE; configured to perform an IP version transformation of the message and send the message to the home calling state control device of the called UE if the home network of the called UE does not support the IP version of the calling UE.

The first unit is further configured to judge whether the called UE supports the IP version of a message upon receiving the message sent from another calling state control device;

the second unit is further configured to forward the message to the called UE if the called UE supports the IP version of the message; and configured to perform an IP version transformation of the message and send the message to the called UE if the called UE does not support the IP version of the message.

The second unit is configured to perform the IP version transformation of the message using a device of the application layer gateway and a device of network address translation and protocol translation if the message contains a media description; and configured to perform the IP version transformation of the message directly if the message does not contain a media description.

In an embodiment of the present invention, through judging by the calling state control function the types of the IP addresses supported by a calling UE and a called UE, or the IP versions supported by the home networks of the calling UE and the called UE, an ALG/NAT-PT function is used only if the IP versions of both the sides are not the same; otherwise, the ALG/NAT-PT function is used or only a mapping of IP versions is performed by the last calling state control function of the end-to-end procedure, that is, by the calling state control function of the called UE. As can be seen through compared with the existing solution, the difference of the technical solution of the embodiment of the present invention and the existing technical solution is that, in the technical solution of the embodiment of the present invention, an IP version transformation or the ALG/NAT-PT function is performed only in the case that the IP versions of the current node and the node of the next hop are not the same, and the communication cannot be performed if no IP version transformation is carried out. That is, the ALG/NAT-PT function is performed at the called side if possible and thus, unnecessary transformation and ALG/NAT-PT processing are avoided. Specifically, query for whether the IP version of the next node is consistent with the current node, and send the message directly if yes; otherwise, send the message after performing an IP version transformation. Querying for the consistency of the IP versions can be performed according to local configuration information or a DNS server.

Such a difference in the two technical solutions brings obvious benefits, that is, firstly, a message is transmitted by the IP version of the calling UE if possible in accordance with the technical solution of the embodiment of the present invention, an IP version transformation is performed only in the case that the communication cannot be performed if no a version transformation. Therefore, many unnecessary IP version transformations can be avoided, which maximally reduces the number of times that the ALG/NAT-PT function is used in a session. Thus, the transmission delay of the session can be reduced, the Quality of Service (QoS) can be improved, and the effect of the interworking between networks of different IP versions is made even better. Secondly, the loads on the device of ALG/NAT-PT are reduced and the performance of the system is improved because the number of times that the ALG/NAT-PT function is used can be decreased significantly. Thirdly, because the IPv4 and the IPv6 are treated comparably in the technical solution of the embodiment of the present invention, which is different from that in the prior art, that is, the IPv6 is used preferentially to transmit a message, the compatibility of this solution is better than that of the solution in the prior art, specifically, this solution can be applied in each phase of using the network commercially, and maximally protect the investments of the operators.

DETAILED DESCRIPTION OF THE INVENTION

The invention is hereinafter described in detail in conjunction with the drawings to further clarify technical solutions and advantages of embodiments of present invention.

In accordance with embodiments of the present invention, in order to reduce unnecessary IP version transformation, IP version transformation is performed at the called side if possible, while at the calling side, no IP version transformation is carried out unless the function entity processing a session in the calling side cannot continue the subsequent communication procedure without the IP version transformation. Thus, unnecessary IP version transformation can be reduced as many as possible, and the interworking between networks of different IP versions is improved, which optimizes the solution to the interworking between networks of different IP versions and achieves better effect of network interworking.

First, it should be noted that in the technical solution of an embodiment of the present invention, considering from the angle convenient to IMS network operators, it is believed that function entities in the same IMS network, that is, the P-CSCF, the I-CSCF and the S-CSCF, each shall support one same IP version. Otherwise, the IMS network operators must also consider the possible interworking scenarios between the different function entities within the IMS network, which requires more complex network planning. In other words, the present invention is described by taking the interworking between two IMS networks as examples; and the present invention may be applied to the interworking between two IMS function entities as well.

Figure 1:
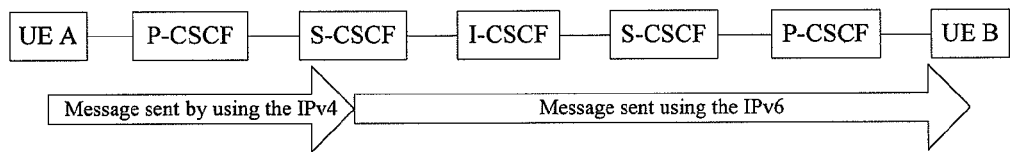
FIG. 1 shows a solution proposed by the 3GPP for implementing an immediate messaging service between a UE supporting the IPv4 and a UE supporting the IPv6.
Figure 2:
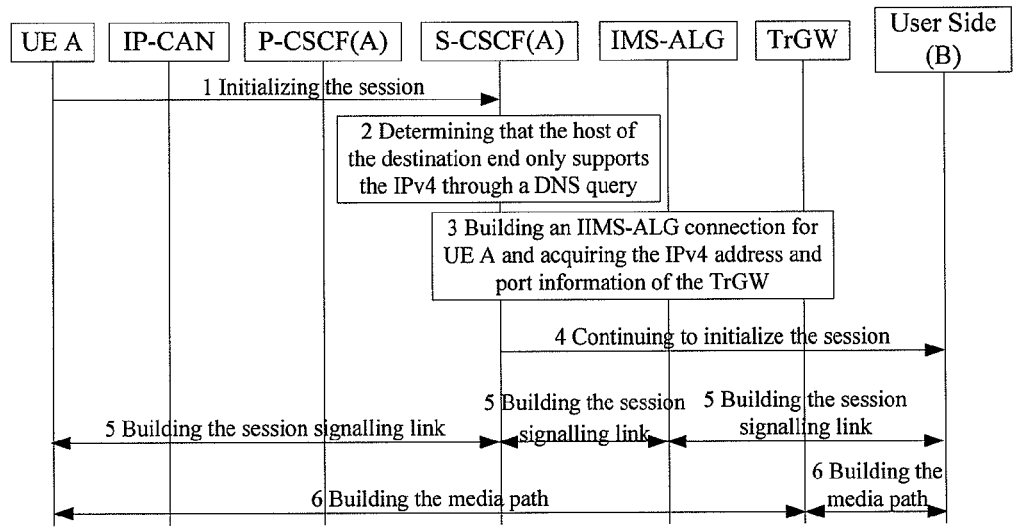
FIG. 2 shows the procedure of an existing solution to the interworking in the case that a UE in an IMS network initiates a session.
Figure 3:
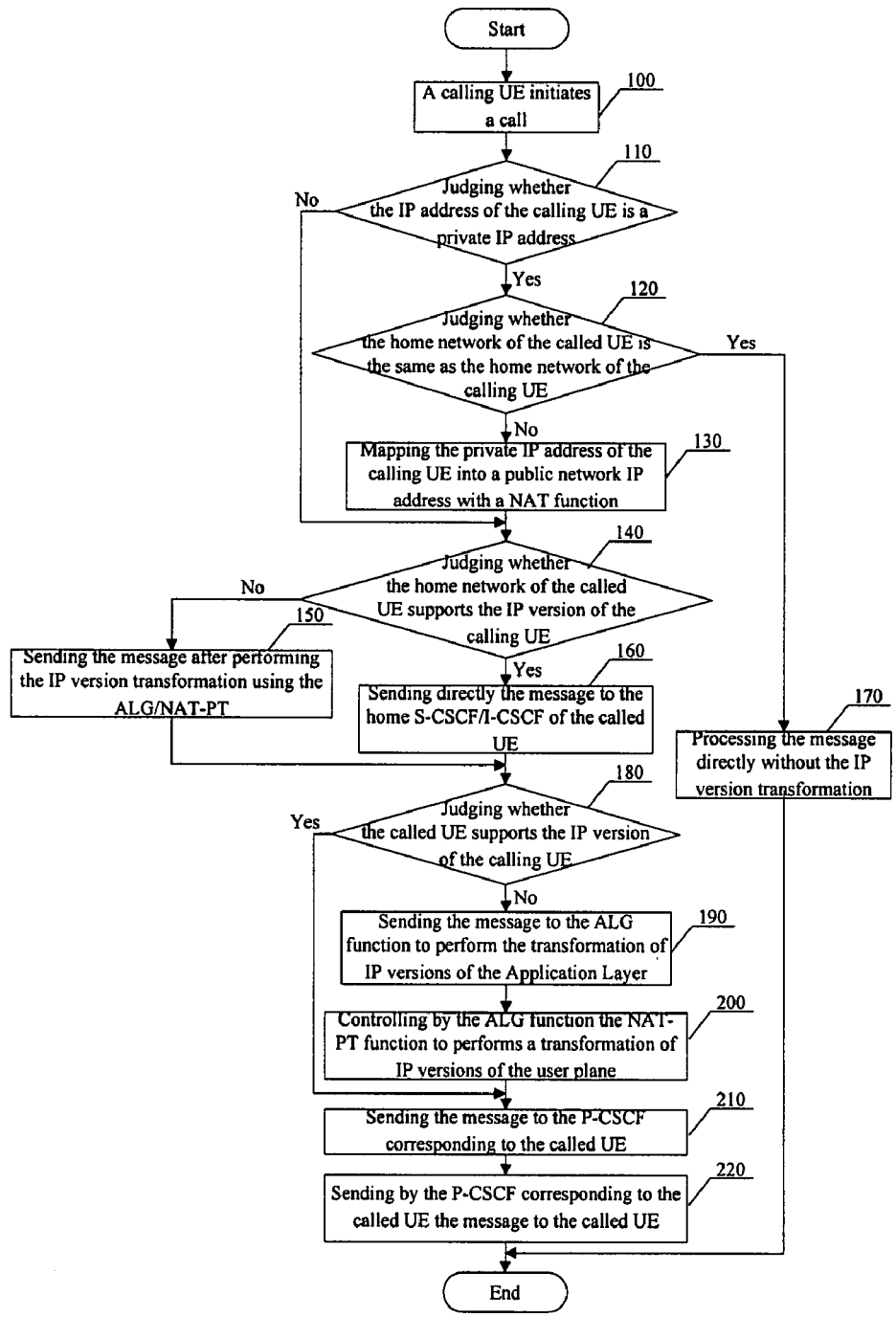
FIG. 3 is a simplified flowchart illustrating a procedure of interworking between networks of different IP versions in a process setting up a session with media negotiation in accordance with a preferred embodiment of the present invention.

The procedure for interworking between networks of different IP versions in a process of setting up a session with media negotiation in accordance with a preferred embodiment of the present invention is shown in FIG. 3.

Step 100: a calling UE initiates a call, where the calling UE can initiate the call using an SIP message.

Step 110: a home S-CSCF of the calling UE judges whether the IP address of the calling UE is a private IP address upon receiving the call initiated by the calling UE, and execute Step 120 if yes; otherwise, execute Step 140. Due to the shortage of IPv4 addresses, many sites in existing IPv4 networks adopt private IPv4 addresses, and a mapping of a private address to a public network address is performed on the edge of the private network and public network when it is needed to access the public network.

Step 120: the home S-CSCF of the calling UE judges whether the home network of the called UE is the same as the home network of the calling UE, and execute Step 170 if yes; otherwise, execute Step 130. In this step, if the home network of the called UE and the home network of the calling UE are the same, the calling UE and the called UE are in the same private network at the same time and the IP versions are also the same. Therefore, it is not needed to map the private IP address to the public network IP address, and an IP version transformation is not needed at all.

Step 130: the home S-CSCF of the calling UE maps the private IP address of the calling UE into a public network IP address using an NAT function entity, that is, transforms the private address into a public network IP address, and then, execute Step 140. The method for mapping a private IP address into a public network IP address is common to those skilled in the art and will not be described in detail herein. Step 140: the home S-CSCF of the calling UE judges whether the home network of the called UE supports the IP version of the calling UE, and execute Step 160 if yes; otherwise, execute Step 150. The home S-CSCF of the calling UE can acquire the IP version of the home network of the called UE by querying a DNS server or local configuration. For example, in the case that what the home S-CSCF of the calling UE has acquired is the domain name of the home network of the called UE, the home S-CSCF can send a querying request to a DNS according to the current IP version used by the home S-CSCF. It should be noted that what is acquired by querying herein is only the address of the I-CSCF on the external interface of the home network of the called UE. But based on the consideration of context, the type of the address of the I-CSCF can be regarded as representing the type of IP address of the IMS network of the called UE. The home S-CSCF of the calling UE can determine whether the calling UE can communicate directly with the peer end without the ALG/NAT-PT transformation according to the type of IP address returned by the DNS server. In an preferred embodiment of the present invention, if the home S-CSCF of the calling UE receives an IPv4 message currently, the home S-CSCF of the calling UE first queries the DNS server according to the domain name of the home network of the called UE to determine whether the home network of the called UE has a corresponding IPv4 address. It is indicated that the home network of the called UE supports the IPv4 or the IPv4 and IPv6 dual stack if the DNS server returns an IPv4 address; otherwise, the DNS server would return only an IPv6 address corresponding to the home network of the called UE. Those skilled in the art can understand that besides querying a DNS server, the address of the called UE, or the domain name of the home network of the called UE and information of the IP version supported by the home network of the called UE can also be configured in the local S-CSCF or in the local I-CSCF. Thus, it is also feasible to determine whether the calling UE can communicate directly with the I-CSCF of the external interface of the home network of the called UE.

Step 150: the home S-CSCF of the calling UE sends the message to the home S-CSCF/I-CSCF of the called UE after performing the IP version transformation using the ALG/NAT-PT, and then execute Step 180.

In a preferred embodiment of the present invention, the home S-CSCF of the calling UE forwards an SIP message to the ALG function entity of the home network of the calling UE to perform the transformation of IP address version information of application layer, then the ALG controls the NAT-PT function entity to perform the transformation of IP address version information of user plane. The ALG function entity may communicate with the NAT-PT function by the SIP, the H.248 Protocol or the MeGaCo Protocol. It is to be noted that when the home S-CSCF of the calling UE forwards the message to the ALG function, it also provides the address of the next hop for routing the message to the ALG function subsequently.

Step 160: the home S-CSCF of the calling UE sends the message directly to the home S-CSCF/I-CSCF of the called UE, and then execute Step 180.

In this step, because the home network of the called UE supports the IP version of the calling UE and the communication can be performed directly without IP version transformation, the home S-CSCF of the calling UE directly sends the message to the home S-CSCF/I-CSCF of the called UE based on the principle that the transformation is performed at the called side if possible.

Step 170: the home S-CSCF of the calling UE processes the message directly without the IP version transformation and the whole procedure terminates. In this step, because the home network of the calling UE and the home network of the called UE are the same, the communication can be directly performed without IP version transformation; the related processing method is fully the same as that in the prior art and will not be described in detail here.

Step 180: the home S-CSCF of the called UE judges whether the called UE supports the IP version of the calling UE after receiving the call initiated to the called UE, and execute Step 210 if yes; otherwise, execute Step 190. The IP version supported by the called UE can be acquired by querying a local configuration or DNS.

Step 190: the home S-CSCF of the called UE sends the message to the ALG function to perform the transformation of IP version in the application layer. The ALG function entity in this step is an ALG function entity in the home network of the called UE. When the home S-CSCF of the called UE forwards the message to the ALG function, it provides the address of the next hop for routing the message for the ALG function subsequently.

Step 200: The ALG function controls the NAT-PT function to perform the IP version transformation in the user plane. The ALG function may communicate with the NAT-PT function by the SIP the H.248 Protocol or the MeGaCo Protocol.

Step 210: forward the message to the P-CSCF corresponding to the called UE. Those skilled in the art can understand that the IP version supported by the P-CSCF corresponding to the called UE and the IP version supported by the called UE are the same.

Step 220: the P-CSCF of the called UE sends the message to the called UE. In this step, the IP version of the message has already been the IP version supported by the called UE.

Thus, the procedure for setting up an end-to-end session with media component is completed.

Those skilled in the art can understand that in the case that an NAT device for transforming the private IP address into the pubic IP address in Step 130 is different from a device for performing the ALG/NAT-PT function in Step 150, the procedure is executed as the above. Otherwise, the transformation of the private IP address into the public IP address in Step 130 can be performed along with the transformation of the ALG/NAT-PT in Step 150.

Figure 4:
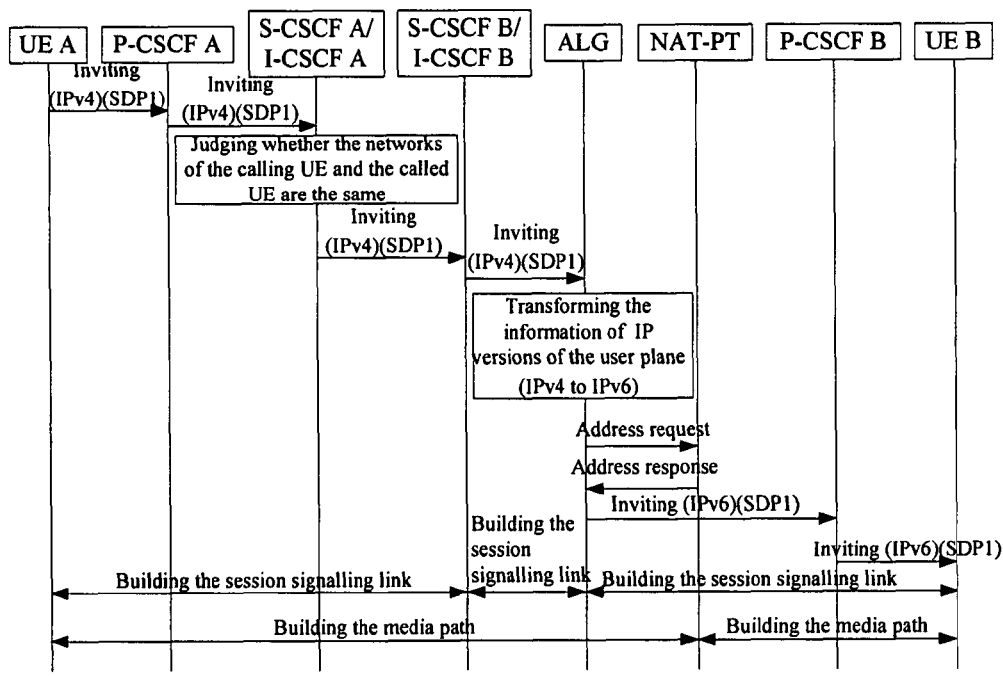
FIG. 4 is a schematic drawing illustrating the message transmission procedure between function entities in a process of setting up an end-to-end session with media negotiation in accordance with a preferred embodiment of the present invention.

According to the above procedure, the procedure of message transmission between function entities in a process of setting up an end-to-end session with media negotiation in accordance with a preferred embodiment of the present invention is shown in FIG. 4. The message transmission procedure of the preferred embodiment shown in FIG. 4 is clear and it is easy for those skilled in the art to understand the procedure with reference to the description in FIG. 3.

The message transmission procedure shown in FIG. 4 is hereinafter described.

First, UE A sends an IMS session request message to UE B, where the message is transmitted by using the IPv4.

Then, P-CSCF A corresponding to UE A forwards the session request message to S-CSCF A/I-CSCF A of the home network of UE A.

Then, S-CSCF A/I-CSCF A detects that the home network of UE B can support the IPv4 version used currently by S-CSCF A by querying a DNS server or according to the local configuration, so S-CSCF A/I-CSCF A decides to continue to forward the session request message to S-CSCF B/I-CSCF B of the home network of UE B.

Then, S-CSCF B/I-CSCF B compares the type of IP address saved by itself with the type of the IP address used in the received request message, and if it is found that the two are different, the ALG/NAT-PT function must be used to perform transformation, so the S-CSCF B/I-CSCF B forwards the message to the ALG function and provides the address of P-CSCF B corresponding to UE B to the ALG function at the same time.

Then, the ALG function performs the transformation of IP address version information from the IPv4 to IPv6, where the ALG function uses the extended SIP, or the H.248 Protocol, or the MeGaCo Protocol to interact with the NAT-PT function due to involving a revision of the user plane; after the interaction ends, the ALG function entity sends the session request message newly constructed to P-CSCF B of the current network of UE B, where the message is transmitted by using IPv6 and the media description has been revised.

Then, P-CSCF B forwards the session request message to UE B.

Finally, the subsequent signalling interactions are performed among UE A, S-CSCF B/I-CSCF B, the ALG function and UE B, that is, in the session signalling path set up as in FIG. 4; and the subsequent media interactions are performed among UE A, the NAT-PT function and UE B, that is, in the media path set up as in FIG. 4.

It should be noted that in the case that no media negotiation is needed in an interworking scenario of IP versions relating to a service, for example, there is only SIP signalling without any media component in an immediate message, no mapping processing of IP address by an ALG function is needed. In this case, the principle for interworking between IP networks of different IP versions is the same as that of the above procedure, that is, an S-SCSF can judge whether there is a media description in a message received and performs IP version transformation of the message using an ALG device and an NAT-PT device if yes; otherwise, because the message is short, no media flow is needed, only a mapping from an IP version to another IP version is performed by the home S-CSCF of the called UE and the ALG/NAT PT function is not performed, that is, the S-CSCF can directly perform the IP version transformation of the message. During the interworking of messages, the IP version of the next hop can be acquired similarly by querying a local configuration or a DNS server.

Figure 5:
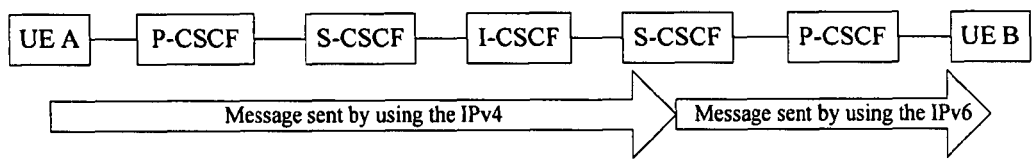
FIG. 5 shows a schematic drawing illustrating the message transmission in a method for implementing an immediate messaging service between a UE supporting the IPv4 and a UE supporting the IPv6 in accordance with a preferred embodiment of the present invention.

A schematic diagram of message transmission in the method for implementing an immediate messaging service between a UE supporting the IPv4 and a UE supporting the IPv6 in accordance with a preferred embodiment of the present invention is shown in FIG. 5. In the message transmission, when sending an immediate message to UE B, UE A directly uses an SIP signalling to carry related information because no negotiation of media component is involved, and the home network of UE B is different from the home network of the UE A. At the called side, the home S-CSCF of UE B supports the IPv4 and IPv6 dual stack, which transforms directly an SIP message transmitted by using IPv4 into an SIP message transmitted by using IPv6, then continues to send the message to the receiver, UE B.

As can be seen from the embodiments of the present invention, after an S-CSCF judges whether types of IP address supported by a calling UE and a called UE or IP versions supported by the home networks of the calling UE and called UE are the same, the ALG/NAT-PT function is not used if the IP versions of the calling UE and the called UE are the same; otherwise, the ALG/NAT-PT function is used or only a mapping of IP versions is performed by the last S-CSCF in the end-to-end procedure, that is, by the S-CSCF of the called UE. Thereby, the number of times that the ALG/NAT-PT function is used can be reduced to the greatest degree. Furthermore, IPv4 and IPv6 are treated equally in the method. In the early phase of IMS application, because more messages are sent by using IPv4, a message is sent by making the most of IPv4 according to the result of querying a DNS server or configuration, while IPv6 becomes the mainstream in the later phase of IMS application, more messages will be sent by using IPv6 in the method. Therefore, the compatibility of the method is good and the method can be applied to each phase of the commercial application of IMS network.

The S-CSCF/I-CSCF in the drawings is only the name of the logical entity corresponding to the calling state control function used in an IMS network. In the case that the method is applied to a general SIP network, the S-CSCF/I-CSCF corresponds to a state proxy server for processing a UE session request in the SIP network and the P-CSCF corresponds to a proxy server in the session path. The functions of the S-CSCF/I-CSCF and the P-CSCF are the same and only the networks to which the method is applied are different. Therefore, the method can also be applied to a general SIP network.

Though the present invention has been illustrated and described by referring to some preferred embodiments of the present invention, a skilled person in the art should understand that various changes can be made in its form and detail without departing from the spirit or scope of the present invention defined in the appended claims.

What is claimed is:

1. A method for interworking between Internet Protocol (IP) networks, comprising:
    judging, by a home calling state control device of a calling User Equipment (UE), whether a home network of a called UE supports an IP version of the calling UE, and forwarding a message sent from the calling UE to a home calling state control device of the called UE if the home network of the called UE supports the IP version of the calling UE, performing an IP version transformation of the message and sending the message to the home calling state control device of the called UE if the home network of the called UE does not support the IP version of the calling UE; and
    judging, by the home calling state control device of the called UE, whether the called UE supports the IP version of the message upon receiving the message, forwarding the message to the called UE if the called UE supports the IP version of the message, performing an IP version transformation of the message and sending the message to the called UE if the called UE does not support the IP version of the message,
    wherein the process of performing an IP version transformation of the message comprises:
    judging, by the home calling state control device of the calling UE, whether the message contains a media description;
    performing the IP version transformation of the message using a device of application layer gateway and a device of network address translation and protocol translation if the message contains the media description;
    performing the IP version transformation of the message directly if the message does not contain the media description.

2. The method of claim 1, further comprising:
    before judging whether the home network of the called UE supports the IP version of the calling UE,
    transforming, by the home calling state control device of the calling UE, a private IP address into a public network IP address using Network Address Translation (NAT) function if it is determined that the IP address of the calling UE is a private IP address.

3. The method of claim 2, further comprising upon determining that the IP address of the calling UE is a private IP address:
    communicating, by the calling UE, with the called UE directly if it is determined that the home network of the called UE is the same as the home network of the calling UE.

4. The method of claim 1, further comprising:
    when performing the IP version transformation of the message using the device of application layer gateway and the device of network address translation and protocol translation;
    providing, by the home calling state control device of the calling UE, an address of a next hop used for routing the message for the device of application layer gateway.

5. The method of claim 1, wherein the device of application layer gateway communicates with the device of network address translation and protocol translation using any one of Session Initiation Protocol (SIP), H.248 Protocol and Media Gateway Control (MeGaCo) Protocol.

6. The method of claim 1, wherein the message is a Session Initiation Protocol (SIP) message.

7. The method of claim 1, wherein the home calling state control device of the calling UE and the home calling state control device of the called UE are calling state control functions of a multimedia subsystem.

8. The method of claim 1, wherein the process of judging whether the called UE supports the IP version of the message comprises:
    acquiring, by the home calling state control device of the called UE, the IP version supported by the called UE through querying a local configuration or a Domain Name System (DNS) server;
determining whether the called UE supports the IP version of the message.

9. The method of claim 1 further comprising:
providing, by the home calling state control device of the called UE, an address of a next hop used for routing the message for the device of application layer gateway.

10. A calling state control device comprising:
a first unit, configured to judge whether a home network of a called User Equipment (UE) supports an Internet Protocol (IP) version of a calling UE upon receiving a message sent from the calling UE;
a second unit, configured to forward the message to a home calling state control device of the called UE if the home network of the called UE supports the IP version of the calling UE; configured to perform an IP version transformation of the message and send the message to the home calling state control device of the called UE if the home network of the called UE does not support the IP version of the calling UE, wherein,
the home calling state control device of the called UE judges whether the called UE supports the IP version of the message upon receiving the message; forwards the message to the called UE if the called UE supports the IP version of the message; and performs an IP version transformation of the message and sends the message to the called UE if the called UE does not support the IP version of the message, and
wherein the second unit is configured to perform the IP version transformation of the message using a device of application layer gateway and a device of network address translation and protocol translation if the message contains a media description; and configured to perform the IP version transformation of the message directly if the message does not contain the media description.

11. The calling state control device of the claim 10, further comprising:
a third unit, configured to acquire the IP version supported by the home network of the called UE through querying a local configuration or a Domain Name System (DNS) server.

12. The calling state control device of the claim 11, wherein:
the third unit is further configured to acquire the IP version supported by the called UE through querying the local configuration or the Domain Name System (DNS) server.

13. The calling state control device of claim 11, wherein the second unit is configured to perform the IP version transformation of the message using a device of application layer gateway and a device of network address translation and protocol translation if the message contains a media description; and configured to perform the IP version transformation of the message directly if the message does not contain the media description.

14. A method for interworking between Internet Protocol (IP) networks, comprising:
judging, by a home calling state control device of a calling User Equipment (UE), whether a home network of a called UE supports an IP version of the calling UE, and forwarding a message sent from the calling UE to a home calling state control device of the called UE if the home network of the called UE supports the IP version of the calling UE, performing an IP version transformation of the message and sending the message to the home calling state control device of the called UE if the home network of the called UE does not support the IP version of the calling UE;
judging, by the home calling state control device of the called UE, whether the called UE supports the IP version of the message upon receiving the message, forwarding the message to the called UE if the called UE supports the IP version of the message, performing an IP version transformation of the message and sending the message to the called UE if the called UE does not support the IP version of the message;
wherein the process of performing an IP version transformation of the message comprises:
judging, by the home calling state control device of the calling UE, whether the message contains a media description;
performing the IP version transformation of the message using a device of application layer gateway and a device of network address translation and protocol translation if the message contains the media description;
performing the IP version transformation of the message directly if the message does not contain the media description.

15. The method of claim 14, further comprising:
when performing the IP version transformation of the message using the device of application layer gateway and the device of network address translation and protocol translation;
providing, by the home calling state control device of the calling UE, an address of a next hop used for routing the message for the device of application layer gateway.

16. The method of claim 14, wherein the device of application layer gateway communicates with the device of network address translation and protocol translation using any one of Session Initiation Protocol (SIP), H.248 Protocol and Media Gateway Control (MeGaCo) Protocol.

17. A calling state control device, comprising:
a first unit, configured to judge whether a home network of a called User Equipment (UE) supports an Internet Protocol (IP) version of a calling UE upon receiving a message sent from the calling UE;
a second unit, configured to forward the message to a home calling state control device of the called UE if the home network of the called UE supports the IP version of the calling UE, configured to perform an IP version transformation of the message and send the message to the home calling state control device of the called UE if the home network of the called UE does not support the IP version of the calling UE, wherein:
the home calling state control device of the called UE judges whether the called UE supports the IP version of the message upon receiving the message; forwards the message to the called UE if the called UE supports the IP version of the message; and performs an IP version transformation of the message and sends the message to the called UE if the called UE does not support the IP version of the message;
wherein the second unit is configured to perform the IP version transformation of the message using a device of application layer gateway and a device of network address translation and protocol translation if the message contains a media description; and configured to perform the IP version transformation of the message directly if the message does not contain the media description.

18. A calling state control device, comprising:

a first unit, configured to judge whether a home network of a called User Equipment (UE) supports an Internet Protocol (IP) version of a calling UE upon receiving a message sent from the calling UE;

a second unit, configured to forward the message to a home calling state control device of the called UE if the home network of the called UE supports the IP version of the calling UE; configured to perform an IP version transformation of the message and send the message to the home calling state control device of the called UE if the home network of the called UE does not support the IP version of the calling UE;

a third unit, configured to acquire the IP version supported by the home network of the called UE through querying a local configuration or a Domain Name System (DNS) server;

wherein:

the home calling state control device of the called UE judges whether the called UE supports the IP version of the message upon receiving the message; forwards the message to the called UE if the called UE supports the IP version of the message; and performs an IP version transformation of the message and sends the message to the called UE if the called UE does not support the IP version of the message; wherein the second unit is configured to perform the IP version transformation of the message using a device of application layer gateway and a device of network address translation and protocol translation if the message contains a media description; and configured to perform the IP version transformation of the message directly if the message does not contain the media description.

* * * * *